3,425,962
SALT OF A DIETHYLAMINOETHYL CROSS-LINKED DEXTRAN ANION EXCHANGER
Edmund S. Granatek and Alphonse P. Granatek, Baldwinsville, N.Y., assignors to Bristol-Myers Company, New York, N.Y., a corporation of Delaware
No Drawing. Filed Dec. 28, 1966, Ser. No. 605,230
U.S. Cl. 260—2.1        1 Claim
Int. Cl. B01j 1/08; A61k 9/00

---

ABSTRACT OF THE DISCLOSURE

The dioctyl sulfosuccinic acid salt of a diethylaminoethyl cross-linked dextran anion exchanger which is a tasteless compound useful as a fecal hydrator or stool softener.

---

Dioctyl sodium sulfosuccinate is a known pharmaceutical and has been used with considerable success in the treatment of constipation caused by physiological anomalies, or by the ingestion of medications which tend to cause hard stools, such as certain iron compounds and aluminum hydroxide.

Unfortunately, this compound has an extremely bitter taste which limits its usefulness to capsules or coated tablets. The process of perparing these dosage forms is complicated by the waxy nature of dioctyl sodium sulfosuccinate requiring the manipulation of a plastic solid.

Liquid forms of dioctyl sodium sulfosuccinate for oral use are available but are unsatisfactory due to the taste problem which has not been completely eliminated. A further problem with respect to aqueous formulations is the low solubility of dioctyl sodium sulfosuccinate.

Therefore, an object of the present invention is to provide a derivative of dioctyl sodium sulfosuccinate having improved taste. Another object of the present invention is to provide a derivative of dioctyl sodium sulfosuccinate that can be utilized in dry and liquid formulations.

These and other objects which will become apparent as this specification proceeds are accomplished by the provision according to the present invention of the dioctyl sulfosuccinic acid salt of a diethylaminoethyl cross-linked dextran anion exchanger, hereinafter referred to as the anion exchanger salt.

The diethylaminoethyl cross-linked dextran anion exchanger used in the adsorption compound of this invention is marketed by Pharmacia Uppsula, Sweden, under the tradename "DEAE-Sephadex." The anion exchanger is a weakly basic anion exchanger and is the diethylaminoethyl derivative of a polymer produced from dextran by cross-linking the linear polysaccharide chains to a three-dimensional network, which acts as a molecular sieve. The polymer is also marketed by Pharmacia Uppsula, Sweden, under the tradename "Sephadex." In the diethylaminoethyl derivative, the diethylaminoethyl groups are attached at random by ether linkages to the glucose residues constituting the polysaccharide chains. The diethylaminoethyl cross-linked dextran anion exchanger used to form the anion exchanger salt of this invention is fully described by B. Spross et al., Acta Pharmaceutica Suecica, vol. 2., No. 1, p. 1 (February 1965).

We have discovered that the anion exchanger salt of this invention does not have the undesirable taste associated with dioctyl sodium sulfosuccinate and is a useful fecal softener. In addition, this compound can be used in both liquid and dry formulations.

We also unexpectedly discovered that while some adsorption products of cross-linked dextran cation exchangers (Sephadex) have been disclosed in the literature (B. Spross et al., supra) the anion exchanger salt of this invention is unusual in that it does not follow the typical elution patterns disclosed by the prior art which teaches that adsorbents on Sephedex exchangers are easily eluded by acid and by neutral salt solutions, cf. p. 11 of the publication by B. Spross et al., cited above. Thus, the vehicles used in liquid formulations containing the anion exchanger salt of this invention are not required to be free of ions or ionizable groups and can contain sugars; formulations which Spross et al. found to be incompatible with their adsorbates. This enables us to prepare flavored and sweetened suspensions of the anion exchanger salt of this invention which are completely free of bitterness. In addition, no difficulty is encountered in preparing tablets and capsules because the salt is dry and free flowing.

We find that elution of dioctyl sulfosuccinic acid from the salt of this invention will occur in the presence of pepsin. Since this enzyme is a normal component of gastric juice, dioctyl sulfosuccinic acid is released upon ingestion of the salt.

The anion exchanger salt of this invention as exemplified below is produced by the reaction of an alkali or alkaline metal salt of dioctyl sulfosuccinic acid such as the sodium, potassium or calcium salt with a diethylaminoethyl cross-linked dextran anion exchanger. The capacity of this type of exchanger is $3.5 \pm 0.5$ milliequivalents per gram. Included within the scope of this invention are compounds wherein the anion exchanger is fully saturated and those in which the anion exchanger is partially saturated, e.g., 1 milliequivalent per gram, however the fully saturated reaction product is preferred.

The anion exchanger salt can be prepared and used in situ in aqueous suspensions of a dioctyl sulfosuccinate salt and a diethylaminoethyl cross-linked dextran anion exchanger or it can be isolated, dried and then formulated. The reaction is preferably carried out at room temperature although it occurs over a wide range of temperature and is carried out in a solvent in which the desired dioctyl sulfosuccinate salt is soluble, e.g., water, isopropanol and the like.

This invention also includes compositions comprising the anion exchanger salt and dosage forms of such compositions.

The compositions of this invention comprise not more than 200 mg./kg. per dosage unit and preferably from about 1 to about 200 mg./kg. and more preferably 5 to 150 mg./kg. of the anion exchanger salt together with a suitable carrier. The carrier may be either a solid or liquid and the compositions can be in the form of tablets, capsules, powders, granules or suspensions. The compositions can contain suitable preservatives, coloring and flavoring agents. Some examples of the carriers which can be used in the preparation of the compositions of this invention are gelatin capsules, corn starch, calcium sulfate, sugars, cellulose derivatives such as sodium carboxymethylcellulose, gelatin, talc, magnesium stearate, vegetable oil, such as peanut oil, etc., liquid petroleum, glycerin, sorbitol, ethanol, agar and water. The carrier may serve as a binder and the compositions may be tabletted. If the carrier is a gelatin capsule, the anion exchanger salt may be encapsulated into the gelatin capsule by conventional means. If a liquid carrier is used, the composition may be in the form of a suspension.

The compositions of the present invention may also contain other therapeutic agents, e.g., laxatives, bulking agents such as sodium or calcium alginate, and other medications useful in assisting alimentary elimination. It may also be combined with certain iron salts or aluminum hydroxide to overcome their tendency to produce hard stools.

Administration of the compositions of this invention to mammals orally in an effective amount is a useful method of treating constipation.

The following examples are intended to illustrate the invention claimed herein without unduly restricting it.

EXAMPLE 1

Dioctyl sodium sulfosuccinate (1 g.) was dissolved in 100 ml. water and added to 0.56 g. DEAE-Sephadex A-25 Fine Anion Exchanger, 200 mesh, lot JO 6072, Pharmacia Uppsula, Sweden, dispersed in 10 ml. water. The mixture was stirred for 1 hour and filtered. The solids were dried in a vacuum oven without heat for 68 hours, yielding 1.28 g. of a white, tasteless solid, dioctyl sulfosuccinic acid salt of DEAE-Sephadex compound.

The dioctyl sulfosuccinic acid salt of DEAE-Sephadex was found to be stable in the presence of gastric juice and dioctyl sulfosuccinic acid was liberated from the compound in the presence of pepsin.

EXAMPLE 2

Dioctyl sodium sulfosuccinate (1125.0 g.) in 1500 ml. isopronpanol was heated to 60° C. with gentle stirring until a solution was obtained (1 hour). Deionized water (6000 ml.) was added and the heating discontinued. DEAE-Sephadex A-25 (832.5 g.) was added with rapid agitation and mixed for 2 hours. The mixture was filtered and the solids washed with 8 liters of water and then dried in a Stokes oven for 20 hours at 45° C. Yield 1752 g. of the dioctyl sulfosuccinic acid salt of DEAE-Sephadex compound.

EXAMPLE 3

Aqueous suspension (fecal softener)

Formula: Per 1000 ml.
| | |
|---|---|
| Dioctyl sodium sulfosuccinate __grams__ | 10.000 |
| Methyl paraben, U.S.P. _____do____ | 1.000 |
| Propyl paraben, U.S.P. _____do____ | 0.200 |
| Sodium saccharin, N.F. _____do____ | 0.200 |
| Sodium cyclamate, N.F. _____do____ | 2.000 |
| Sucrose, granulated, U.S.P. _____do____ | 287.000 |
| DEAE-Sephadex, A-25 fine ____do____ | 7.400 |
| Carrageenans (gelcarin HWG, marine colloids) _____do____ | 0.1667 |
| Carrageenans (gelcarin DG, marine colloids) _____do____ | 1.6667 |
| Calcium sulfate dihydrate _____do____ | 0.3333 |
| Sodium citrate tribasic, anhydrous _____do____ | 0.3333 |
| Sodium benzoate, U.S.P. _____do____ | 1.0000 |
| FD and C Yellow #6 _____do____ | 0.0333 |
| Flavors _____ml__ | 0.6000 |
| Purified water, U.S.P., q.s. to 1000.0000 ml. | |

Manufacturing instructions (1) Dissolve the dioctyl sodium sulfocuccinate in ¾ of the batch volume of purified water by gently agitating for approximately 18 hours. If agitation is too vigorous, considerable foaming will occur.

(2) Add the parabens, sodium saccharin and 95% of the sucrose. Continue mixing until dissolved.

(3) Add the sodium cyclamate with moderate agitation. The solution will become hazy.

(4) With vigorous agitation, add the DEAE-Sephadex. Reduce agitation to a moderate rate and mix 30 minutes or until bitterness is no longer evident.

(5) prepare a dry blend of the remaining 5% of the sucrose with the carrageenans. Pass the blend through a Fitzmill equipped with a #00 screen at high speed with knives forward.

(6) Slowly add the milled blend into the vortex of the batch with rapid agitation.

(7) Pass the blend through a suitable mill. (Mill setting to be determined.) Up to 4% of the batch volume of purified water may be used to rinse the tank and mill.

(8) Heat to 60° C. and add the sodium citrate followed by the calcium sulfate and sodium benzoate into the vortex of the batch with rapid agitation. With moderate agitation, maintain temperature at 60° C. for 30 minutes to insure solution of the calcium sulfate.

(9) Discontinue heat and cool to ambient temperature with moderate agitation.

(10) Prepare a solution of the dye and add it to the mixing batch. Up to 0.2% of the batch volume of purified water may be used for the solution and rinsing.

(11) Deaerate while mixing under vacuum.

(12) Add the flavors and bring the batch up to final volume.

(13) Mix well and fill.

In the foregoing procedure, the dioctyl sulfosuccinic acid salt of DEAE-Sephadex is produced in situ.

EXAMPLE 4

Soft gelatin capsule (laxative)

Formula: Per capsule, grams
| | |
|---|---|
| Dioctyl sulfosuccinic acid salt of DEAE-Sephadex (as dioctyl sulfosuccinic acid) | 0.09484 |
| Carboxypolymethylene (carpobol 934, B.F. Goodrich, 60 mesh) _____ | 0.44100 |
| Soy bean oil, refined _____ | [1] 0.480 |
| Lecithin, soya _____ | [1] 0.015 |

[1] Mixture used to q.s. for proper fill per capsule.

Manufacturing instructions (1) With agitation, into a suitable container, dissolve the lecithin in the soy bean oil.

(2) With agitation, incorporate all the ingredients.

(3) Pass the suspension through a premier mill.

(4) Deaerate.

(5) Fill into the smallest size capsules possible, using a soft gelatin encapsulating machine.

EXAMPLE 5

Capsules (fecal softener)

Formula: Per capsule, grams
| | |
|---|---|
| Dioctyl sulfosuccinic acid salt of DEAE-Sephadex, 200 mesh _____ | 0.09484 |
| Magnesium stearate, U.S.P. _____ | 0.00160 |
| Lactose, U.S.P. q.s. | |

Manufacturing instructions (1) Blend all of the ingredients until homogenous.

(2) Fill into #3 capsules.

EXAMPLE 6

Capsules (fecal softener)

Formula: Per capsule, grams
| | |
|---|---|
| Dioctyl sulfosuccinic acid salt of DEAE-Sephadex, 200 mesh (as dioctyl sulfosuccinic acid) _____ | 0.04742 |
| Magnesium stearate, U.S.P. _____ | 0.00080 |
| Lactose, U.S.P. q.s. | |

Manufacturing instruction
(1) Blend all the ingredient until homogenous.
(2) Fill into #4 capsules.

EXAMPLE 7

Capsules (fecal softener)

Formula: Per capsule, grams
- Dioctyl sulfosuccinic acid salt of DEAE-Sephadex, 200 mesh (as dioctyl sulfosuccinic acid) _____ 0.09484
- Soy bean oil, refined _____ [1] 0.480
- Lecithin, soya _____ [1] 0.015

[1] Mixture used to q.s.

Manufacturing instructions (1) With agitation in a suitable container, dissolve the lecithin in the soy bean oil.
(2) With agitation, incorporate all the ingredients.
(3) Pass the suspension through a premier mill.
(4) Deaerate.
(5) Fill into the smallest size capsules possible, using a soft gelatin encapsulating machine.

EXAMPLE 8

Capsules (fecal softener—laxative)

Formula: Per capsule, grams
- Dioctyl sulfosuccinic acid salt of DEAE-Sephadex, 200 mesh (as dioctyl sulfosuccinic acid) _____ 0.09484
- Methanol extract of cascara sagrada (casanthranol) S. B. Penick & Company _____ 0.030
- Soy bean oil, refined _____ [1] 0.480
- Lecithin, soya _____ [1] 0.015

[1] Mixture used to q.s.

Manufacturing instructions (1) With agitation, in a suitable container, dissolve the lecithin in the soy bean oil.
(2) With agitation, incorporate all the ingredients.
(3) Pass the suspension through a premier mill.
(4) Deaerate.
(5) Fill into the smallest size capsules possible, using a soft gelatin encapsulating machine.

EXAMPLE 9

Small compressed tablets (fecal softener)

Conventional tablets are prepared from the following ingredients:

Per tablet, grams
- Dioctyl sulfosuccinic acid salt of DEAE-Sephadex (as dioctyl sulfosuccinic acid) _____ 0.0868
- Calcium lactate, granular _____ 0.1582
- Magnesium stearate _____ 0.005

The above ingredients were weighed out, passed through a #30 and #60 mesh screen and blended. The blend was then tabletted on a Stoke single-punch machine, equipped with 3/8" standard, concave punches, upper bisected.

EXAMPLE 10

Small compressed tablet (laxative)

Formula: Per tablet, grams
- Silicone dioxide, fine powder _____ 0.1100
- Carboxypolymethylene (carbopol 934) B. F. Goodrich Chemical Co. _____ 0.4400
- Dioctyl sulfosuccinic acid salt of DEAE-Sephadex (as dioctyl sulfosuccinic acid) 0.09484
- Calcium carbonate, light, precipitated ___ 0.1500
- Magnesium stearate, U.S.P. _____ 0.0036

Manufacturing instructions (1) Blend all of the ingredients except the magnesium stearate.
(2) Place the blend in a pony pan and wet granulate using aproximately 625 ml. of water per 1000 tablets.
(3) Spread the granulation on trays and dry at 67° C. (152.6° F.)
(4) Mill the dried granulation using a combination of screen, speed and blade adjustment which will produce the greatest percentage of 40 to 60 mesh granules.
(5) Add the magnesium stearate and blend thoroughly.
(6) Tablet using 1/32" bisected, standard concave punches to a hardness of 10 to 12 kg. (Strong, Cobb, Arner Tester).

EXAMPLE 11

Aqueous suspension (laxative)

Formula: Per 3000 ml.
- Dioctyl sodium sulfosuccinate _____grams__ 30.0
- Methyl paraben, U.S.P. _____do____ 3.0
- Propyl paraben, U.S.P. _____do____ 0.6
- Sodium saccharine, N.F. _____do____ 0.6
- Sodium sucaryl _____do____ 6.0
- Sucrose granulated, U.S.P. _____do____ 861.0
- DEAE-Sephadex, A-25, fine _____do____ 22.2
- Carrageenans (gelcarin HWG, marine colloids) _____do____ 0.5
- Carrageenans (gelcarin DG, marine colloids) _____do____ 5.0
- Calcium sulfate dihydrate _____do____ 1.0
- Sodium citrate U.S.P. _____do____ 1.0
- FD and C Yellow #6 _____do____ 0.1
- Aluminum carbopol _____do____ 306.6
- Flavors _____ml.__ 1.8
- Purified water, U.S.P. q.s. to 3000.0 ml.

Manufacturing instructions (1) Dissolve the dioctyl sodium sulfosuccinate in 3/4 of the batch volume of purified water by gently agitating for approximately 18 hours. If agitation is too vigorous, considerable foaming will occur.
(2) Add the parabens, sodium saccharin and 95% of the sucrose. Continue mixing until dissolved.
(3) Add the sodium sucaryl with moderate agitation. The solution will become hazy.
(4) With vigorous agitation, add the DEAE-Sephadex. Reduce agitation to a moderate rate and mix 30 minutes or until bitternes is no longer evident.
(5) Prepare a dry blend of the remaining 5% of the sucrose with the carrageenans. Pass the blend through a Fitzmill equipped with a #00 screen at high speed with knives forward.
(6) Slowly add the milled blend into the vortex of the batch with rapid agitation.
(7) Pass the blend through a suitable mill. (Mill setting to be determined.) Up to 4% of the batch volume of purified water may be used to rinse the tank and mill.
(8) Heat to 60° C. and add the sodium citrate followed by the calcium sulfate and sodium benzoate into the vortex of the batch with rapid agitation. With moderate agitation, maintain temperature at 60° C. for 30 minutes to insure solution of the calcium sulfate.
(9) Discontinue heat and cool to ambient temperature with moderate agitation.
(10) Prepare a solution of the dye and add it to the mixing batch. Up to 0.2% of the batch volume of purified water may be used for the solution and rinsing.
(11) Add the aluminum carbopol and mix thoroughly.
(12) Deaerate while mixing under vacuum.
(13) Add the flavors and bring the batch up to final volume.
(14) Mix well and fill.

EXAMPLE 12

Aqueous suspension (laxative)

Formula: Per 3000 ml.
- Dioctyl sodium sulfosuccinate _____ grams__ 30.0
- Methyl paraben, U.S.P. _____ do____ 3.0
- Propyl paraben, U.S.P. _____ do____ 0.6
- Sodium saccharine, N.F. _____ do____ 0.6
- Sodium sucaryl _____ do____ 6.0
- Sucrose granulated, U.S.P. _____ do____ 861.0
- DEAE-Sephadex, A–25, fine _____ do____ 22.2
- Carrageenans (gelcarin HWG, marine colloids) _____ do____ 0.5
- Carrageenans (gelcarin DG, marine colloids) _____ do____ 5.0
- Calcium sulfate dihydrate _____ do____ 1.0
- Sodium citrate, U.S.P. _____ do____ 1.0
- FD and C, red #6 _____ do____ 0.250
- Casanthranol _____ do____ 18.0
- Flavors _____ ml__ 0.75
- Purified water, U.S.P. q.s. to 3000.0 ml.

Manufacturing instructions (1) Dissolve the dioctyl sodium sulfosuccinate in ¾ of the batch volume of purified water by gently agitating for approximately 18 hours. If agitation is too vigorous, considerable foaming will occur.

(2) Add the parabens, sodium saccharin and 95% of the sucrose. Continue mixing until dissolved.

(3) Add the sodium sucaryl with moderate agitation. The solution will become hazy.

(4) With vigorous agitation, add the DEAE-Sephadex. Reduce agitation to a moderate rate and mix 30 minutes or until bitterness is no longer evident.

(5) Prepare a dry blend of the remaining 5% of the sucrose with the carrageenans, Pass the blend through a Fitzmill equipped with a #00 screen at high speed with knives forward.

(6) Slowly add the milled blend into the vortex of the batch with rapid agitation.

(7) Pass the blend through a suitable mill. (Mill setting to be determined.) Up to 4% of the batch volume of purified water may be used to rinse the tank and mill.

(8) Heat to 60° C. and add the sodium citrate followed by the calcium sulfate and sodium benzoate into the vortex of the batch with rapid agitation. With moderate agitation, maintain temperature at 60° C. for 30 minutes to insure solution of the calcium sulfate.

(9) Discontinue heat and cool to ambient temperature with moderate agitation.

(10) Prepare a solution of the dye and add it to the mixing batch. Up to 0.2% of the batch volume of purified water may be used for the solution and rinsing.

(11) Add the casanthranol.

(12) Deaerate while mixing under vacuum.

(13) Add the flavors and bring the batch up to fiinal volume.

(14) Mix well and fill.

While this invention has been described in terms of its preferred embodiment, those skilled in the art will appreciate that modifications can be made without departing from the spirit and scope of the invention.

What is claimed is:

1. The dioctyl sulfosuccinic acid salt of a diethylamino-cross-linked dextran anion exchanger.

References Cited

UNITED STATES PATENTS

| | | | |
|---|---|---|---|
| 2,987,441 | 6/1961 | Brudney et al. | 167—65 |
| 3,155,577 | 11/1964 | Mercer et al. | 167—56 |
| 3,277,025 | 10/1966 | Flodin et al. | 260 |

OTHER REFERENCES

Spross et al., Acta Pharmaceutica, 2 1–12 (1965).

WILLIAM H. SHORT, *Primary Examiner.*

M. GOLDSTEIN, *Assistant Examiner.*

U.S. Cl. X.R.

424—79, 303